United States Patent [19]

Phaal

[11] Patent Number: 4,694,710

[45] Date of Patent: Sep. 22, 1987

[54] METHOD OF MAKING A BLANK OF A DRILL BIT

[76] Inventor: Cornelius Phaal, 34 Rutland Avenue, Craighall Park, Johannesburg, Transvaal, South Africa

[21] Appl. No.: 869,974

[22] Filed: Jun. 2, 1986

[30] Foreign Application Priority Data

Jun. 13, 1985 [ZA] South Africa .................. 85/4462

[51] Int. Cl.⁴ .............................................. B23P 15/32
[52] U.S. Cl. ................................................. 76/108 R
[58] Field of Search ............. 76/108 R, 108 T, 101 R, 76/DIG. 11, DIG. 12, DIG. 6; 75/231

[56] References Cited

U.S. PATENT DOCUMENTS 4,224,380  9/1980  Bovenkerk ........................... 75/231

FOREIGN PATENT DOCUMENTS 547333  4/1977  U.S.S.R. ............................ 76/108 T

Primary Examiner—Roscoe V. Parker
Attorney, Agent, or Firm—Scully, Scott, Murphy & Presser

[57] ABSTRACT

A plurality of blanks for drill bits are produced from a disc-shaped composite abrasive compact by first producing a plurality of sticks of polygonal shape end-on and thereafter longitudinally rounding each stick. The rounded drill blank is then fluted to produce a small diameter twist drill bit.

6 Claims, 3 Drawing Figures

METHOD OF MAKING A BLANK OF A DRILL BIT

BACKGROUND OF THE INVENTION

This invention relates to a method of making a blank for a drill bit wherein the cutting edge is provided by an abrasive compact.

Abrasive compacts are well known in the art and are used extensively in industry for the abrading of various work pieces. They consist essentially of a mass of abrasive particles generally present in an amount of at least 70 percent, preferably 80 to 90 percent, by volume of the compact bonded into a hard conglomerate. Compacts are polycrystalline masses and can replace single large crystals in many applications. The abrasive particles of compacts are invariably ultra-hard abrasives such as diamond and cubic boron nitride.

Abrasive compacts generally contain a second phase or bonding matrix which contains a solvent/catalyst useful in synthesising the particles. In the case of cubic boron nitride, examples of suitable solvent/catalysts are aluminium or an alloy of aluminium with nickel, cobalt, iron, manganese or chromium. In the case of diamond, examples of suitable solvent/catalysts are metals of Group VIII of the Periodic Table such as cobalt, nickel or iron or an alloy containing such a metal.

As is known in the art, diamond and cubic boron nitride compacts are manufactured under conditions of temperature and pressure at which the abrasive particle is crystallographically stable.

Abrasive compacts may be bonded directly to a tool or shank for use. Alternatively, they may be bonded to a backing such as a cemented carbide backing prior to being mounted on a tool or shank. Such backed compacts are also known in the art as composite abrasive compacts. Bonding of the compact to the backing may be direct or through a bonding layer of a material different to the compact or backing.

Diamond abrasive compacts which contain a metallic phase are thermally sensitive and tend to degrade rather rapidly at temperatures above about 700° C. at ambient pressure. Several diamond compacts are known which are thermally stable under these conditions. Such compacts are described, for example, in U.S. Pat. No. 4,224,380 and the complete specifications of South African Pat. Nos. 84/0053 and 85/2177.

In the manufacture of printed circuit boards it is often necessary to form a plurality of small holes therein. These holes are generally formed by means of a small diameter twist drill. Since such boards are abrasive, for example made of fibre reinforced plastic, it has been found that drill bits tipped with diamond abrasive compact are particularly suitable. Such drill bits are typically of fluted circular section. Examples of such drill bits and blanks for such drill bits can be found in European Patent Publication No. 0168953. Japanese Patent Publication No. 58/83790 describes hexagonal shaped composite abrasive compact inserts for drill bits. These inserts have a transverse dimension much greater than their thickness or depth dimension.

SUMMARY OF THE INVENTION

According to the present invention, there is provided a method of producing a blank for a drill bit comprising providing a composite abrasive compact having a diamond or cubic boron nitride compact bonded to a cemented carbide backing and having major flat surfaces on each of opposite sides thereof, severing the composite abrasive compact along planes perpendicular to the flat surfaces and from one flat surface to the other to produce a plurality of sticks polygonally-shaped end-on, each sever plane defining side surfaces of adjacent sticks, and longitudinally rounding each stick to produce from it a blank for a drill bit which is round end-on, comprises a diamond or cubic boron nitride compact bonded to an elongated cemented carbide rod, has a diameter in the range 0.5 to 5 mm and a diameter to length ratio of 1:3 to 1:20.

According to another aspect of the invention, there is provided a stick for use in making a drill bit which is hexagonally-shaped end-on and comprises a diamond or cubic boron nitride compact bonded to an elongated cemented carbide rod, the largest transverse dimension of the stick being in the range 0.5 to 5 mm and the ratio of the largest transverse dimension to the length of the stick being in the range 1:3 to 1:20.

DETAILED DESCRIPTION OF THE INVENTION

Figures 1, 2, 3:
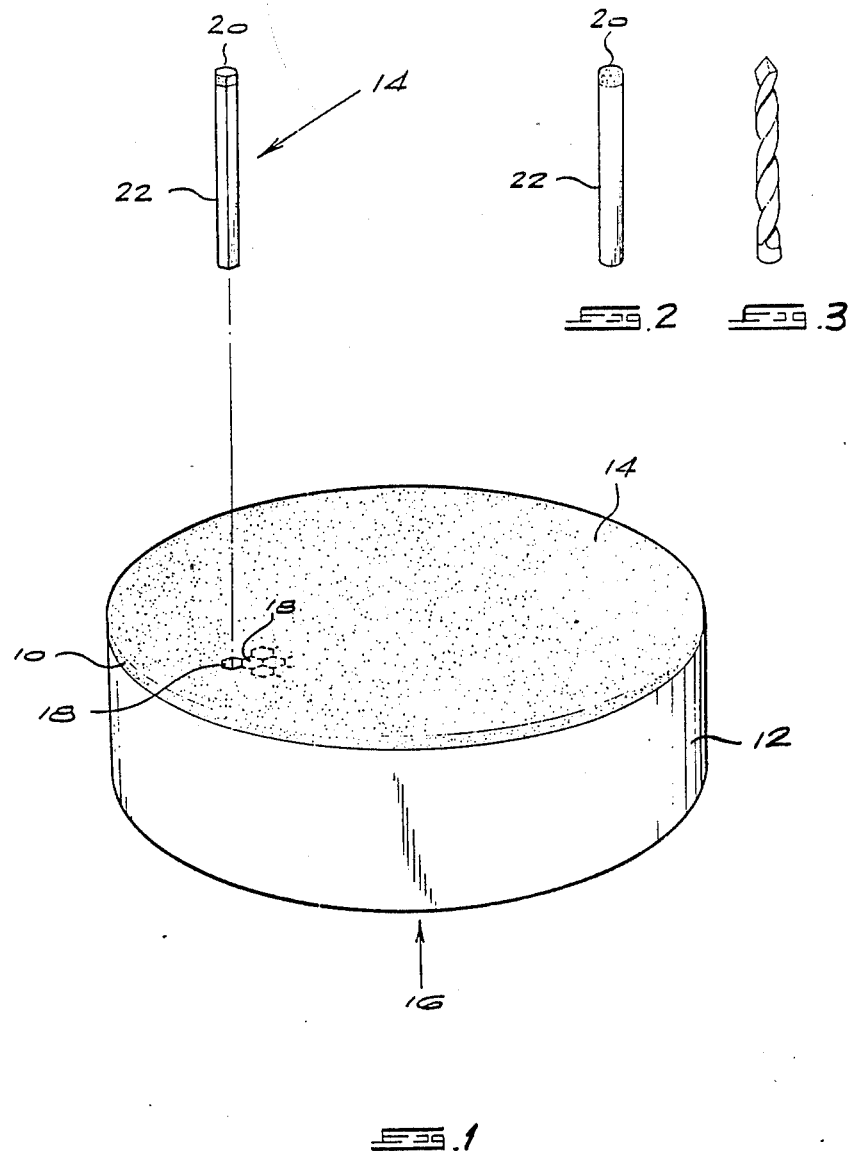
FIG. 1 illustrates a perspective view of a composite abrasive compact from which a plurality of hexagonally-shaped sticks are cut.
FIG. 2 is a perspective view of an embodiment of a blank for a drill bit of the invention.
FIG. 3 is a perspective view of a twist drill bit produced from the blank of FIG. 2.

The blanks which are produced by the method of the invention are small and may be used for producing small diameter twist drill bits for making holes in articles such as fibre reinforced plastic boards. The invention provides a particularly effective and economical method of producing such blanks. The composite abrasive compact, which will generally be of a disc-shape, is severed along planes perpendicular to the flat end surfaces thereof. By serverring the composite compact into sticks which are each polygonally-shaped end-on means that each severed plane defines side surfaces of adjacent sticks. Very little wastage of the composite (which is an expensive material) results. This is particularly so when the stick has a hexagonal shape end-on.

Severing of the composite abrasive compact may be achieved by cutting techniquues known in the art such as electric discharge, spark erosion or laser beam cutting methods.

The sticks are longitudinally rounded to produce the blanks. Rounding is preferably achieved by centreless grinding. Centreless grinding involves feeding the stick longitudinally between a pair of contacting rollers, the one roller presenting an abrasive surface and the other roller presenting a resilient surface.

When the stick is hexagonally-shaped end-on the largest transverse dimension is preferably in the range 1 to 2.5 mm and the ratio of the largest transverse dimension to the length of the stick is preferably in the range 1:4 to 1:16.

The diameter of the blank is preferably in the range 1 to 2.5 mm and the diameter to length ratio is preferably in the range 1:4 to 1:16.

The composite abrasive compact may be made by methods known in the art. Preferably there is direct bonding between the diamond or cubic boron nitride compact and the cemented carbide backing. Direct bonding means that the compact layer is bonded directly to the cemented carbide backing without the interposition of a layer of another material. The cemented carbide backing may be cemented tungsten carbide, cemented tantalum carbide or cemented titanium carbide. Preferably the backing is made of cemented tungsten carbide.

An embodiment of the invention will now be described with reference to the accompanying drawings. Referring to FIG. 1, there is shown a disc-shaped composite abrasive compact comprising an abrasive compact layer 10 bonded directly to a cemented carbide backing 12. The cemented carbide backing is very much thicker than the abrasive compact layer. The composite abrasive compact may be made by methods well known in the art and as described above.

A plurality of hexagonally-shaped sticks for use in manufacturing drill bits may be cut from this disc-shaped abrasive compact. Each cut is made perpendicular to the flat end surfaces 14, 16 of the composite abrasive compact and extend from one flat surface to the other. It will be noted that each cut or sever plane 18 defines the side surfaces of adjacent sticks. Each stick thus produced consists of an abrasive compact 20 bonded to an elongate cemented carbide rod 22. The hexagonal section extends down the entire length of the stick.

The sticks thus produced are now rounded to a form illustrated by FIG. 2 using centreless grinding. The rounded stick provides a blank for a drill bit which may now be fluted by methods known in the art to produce a twist drill bit as illustrated by FIG. 3.

I claim:
1. A method of producing a blank for a drill bit comprising providing a cylindrically-shaped composite abrasive compact having a diamond or cubic boron nitride compact bonded to a cemented carbide backing and having major flat end surfaces in which one flat end surface is the diamond or cubic boron nitride compact and the other is the cemented carbide backing, severing the composite abrasive compact along plane perpendicular to the flat surfaces and from one flat end surface to the other flat end surface to produce a plurality of sticks polygonally-shaped end-on, each sever plane defining side surfaces of adjacent sticks, and longitudinally rounding each stick to produce from it a blank for a drill bit which is round end-on, comprises a diamond or cubic boron nitride compact bonded to an elongated cemented carbide rod, and has a diameter in the range 0.5 to 5 mm and a diameter to length ratio in the range 1:3 to 1:20.

2. A method of claim 1 wherein the diameter of each blank is in the range 1 to 2.5 mm.

3. A method of claim 1 wherein the diameter to length ratio of each blank is in the range 1:4 to 1:16.

4. A method of claim 1 wherein severing of the composite abrasive compact is effected by spark erosion, electric discharge or laser beam cutting.

5. A method according to claim 1 wherein the sticks are rounded by centreless grinding.

6. A method according to claim 1 wherein the sticks are hexagonally shaped end-on.

* * * * *